United States Patent
Ren et al.

(10) Patent No.: US 11,995,856 B2
(45) Date of Patent: *May 28, 2024

(54) VIDEO DEPTH ESTIMATION BASED ON TEMPORAL ATTENTION

(71) Applicant: Samsung Electronics Co., Ltd., Suwon-si (KR)

(72) Inventors: Haoyu Ren, San Diego, CA (US); Mostafa El Khamy, San Diego, CA (US); Jungwon Lee, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,599

(22) Filed: Dec. 13, 2022

(65) Prior Publication Data
US 2023/0116893 A1    Apr. 13, 2023

Related U.S. Application Data

(63) Continuation of application No. 16/841,618, filed on Apr. 6, 2020, now Pat. No. 11,527,005.

(Continued)

(51) Int. Cl.
*G06T 7/579*    (2017.01)
*G06T 3/18*    (2024.01)
*G06T 7/194*    (2017.01)

(52) U.S. Cl.
CPC .............. *G06T 7/579* (2017.01); *G06T 7/194* (2017.01); *G06T 3/18* (2024.01);
(Continued)

(58) Field of Classification Search
CPC . G06T 2207/20084; G06T 2207/20081; G06T 7/50–596; G06T 2207/10016;
(Continued)

(56) References Cited

U.S. PATENT DOCUMENTS 8,854,425 B2    10/2014    Varekamp
9,600,898 B2    3/2017    Liu et al.
(Continued)

FOREIGN PATENT DOCUMENTS

CN    101640809 B    11/2010
CN    105590309 A    5/2016
(Continued)

OTHER PUBLICATIONS

Zhu, Xizhou, et al. "Flow-Guided Feature Aggregation for Video Object Detection." 2017 IEEE International Conference on Computer Vision (ICCV). IEEE, 2017. (Year: 2017).*

(Continued)

*Primary Examiner* — Geoffrey E Summers
(74) *Attorney, Agent, or Firm* — Lewis Roca Rothgerber Christie LLP

(57) ABSTRACT

A method of depth detection based on a plurality of video frames includes receiving a plurality of input frames including a first input frame, a second input frame, and a third input frame respectively corresponding to different capture times, convolving the first to third input frames to generate a first feature map, a second feature map, and a third feature map corresponding to the different capture times, calculating a temporal attention map based on the first to third feature maps, the temporal attention map including a plurality of weights corresponding to different pairs of feature maps from among the first to third feature maps, each weight of the plurality of weights indicating a similarity level of a corresponding pair of feature maps, and applying the temporal attention map to the first to third feature maps to generate a feature map with temporal attention.

18 Claims, 6 Drawing Sheets
(5 of 6 Drawing Sheet(s) Filed in Color)

Related U.S. Application Data

(60) Provisional application No. 62/877,246, filed on Jul. 22, 2019.

(52) U.S. Cl.
CPC .............. *G06T 2207/10016* (2013.01); *G06T 2207/20021* (2013.01); *G06T 2207/20084* (2013.01)

(58) Field of Classification Search
CPC . G06T 2207/20021; G06T 2207/10024; G06T 7/90; G06T 3/0093; G06T 7/20–38; G06T 3/18; G06V 10/82; G06N 3/02–0985
See application file for complete search history.

(56) References Cited

U.S. PATENT DOCUMENTS

| | | |
|---|---|---|
| 10,115,040 B2 | 10/2018 | Brauer |
| 10,679,373 B2 | 6/2020 | Riemens |
| 2008/0095436 A1 | 4/2008 | Kim et al. |
| 2010/0188584 A1 | 7/2010 | Liu et al. |
| 2012/0127267 A1 | 5/2012 | Zhang et al. |
| 2012/0154528 A1 | 6/2012 | Hidaka et al. |
| 2013/0069935 A1 | 3/2013 | Liu et al. |
| 2015/0371395 A1 | 12/2015 | Sendik |
| 2016/0117832 A1 | 4/2016 | Liu et al. |

FOREIGN PATENT DOCUMENTS

| | | |
|---|---|---|
| TW | 201802772 A | 1/2018 |
| TW | 201824417 A | 7/2018 |

OTHER PUBLICATIONS

Alhashim, Ibraheem, and Peter Wonka. "High quality monocular depth estimation via transfer learning." arXiv preprint arXiv:1812.11941v2 (2019). (Year: 2019).*

Chennupati, Sumanth, et al. "MultiNet++: Multi-Stream Feature Aggregation and Geometric Loss Strategy for Multi-Task Learning." arXiv preprint arXiv:1904.08492v2 (2019). (Year: 2019).*

Taiwan Office Action for TW Application No. 109123645 dated Sep. 8, 2023, 5 pages.

Li, Ruibo, et al., "Deep attention-based classification network for robust depth prediction," http://www.robustvision.net/inde.php, https://arxiv.org/pdf/1807.03959.pdf Jul. 11, 2018, 17 pages.

Zhou, T. et al., "Unsupervised Learning of Depth and Ego-Motion from Video," 2017 IEEE Conference on Computer Vision and Pattern Recognition (CVPR). IEEE, 2017 (Year: 2017) 10 pages.

* cited by examiner

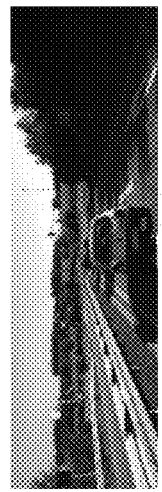
FIG. 2A Center frame of input video
FIG. 2B B-channel attention map
FIG. 2C G-channel attention map
FIG. 2D R-channel attention map
FIG. 2E Center frame of input video
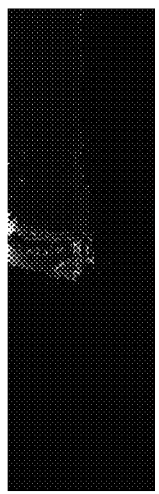
FIG. 2F B-channel attention map
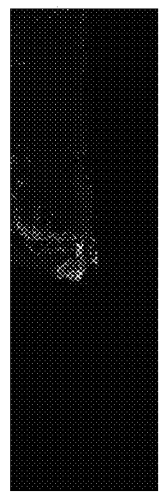
FIG. 2G G-channel attention map
FIG. 2H R-channel attention map

VIDEO DEPTH ESTIMATION BASED ON TEMPORAL ATTENTION

CROSS-REFERENCE TO RELATED APPLICATION(S)

This application is a continuation of U.S. patent application Ser. No. 16/841,618, filed Apr. 6, 2020, which, which claims priority to, and the benefit of, U.S. Provisional Application No. 62/877,246 ("VIDEO DEPTH ESTIMATION BASED ON TEMPORAL ATTENTION"), filed on Jul. 22, 2019, the entire content of which is incorporated herein by reference.

FIELD

Aspects of embodiments of the present disclosure are generally related to image depth estimation.

BACKGROUND

There has been recent interest in the estimation of the real-world depth of elements in a captured scene. Accurate depth estimation allows for the separation of the foreground (close) objects from the background (far) objects in a scene. Accurate foreground-background separation allows one to process captured images to emulate effects such as the Bokeh effect, which refers to the soft out-of-focus blur of the background. The Bokeh effect may be created by using the right settings in expensive cameras with fast lens, and wide apertures, as well as by adjusting the camera closer to the subject and the subject further away from the background to emulate the shallow depth-of-field. Thus, accurate depth estimation may allow processing images from non-professional photographers or cameras with smaller lenses (such as mobile phone cameras) to obtain more aesthetically pleasant images with the Bokeh effect which focus on the subject. Other applications of accurate depth estimation may include 3D object reconstruction and virtual reality applications, where it is desired to change the background or the subject and render them according to the desired perceived virtual reality. Other applications of accurate depth estimation from the captured scene may be in car automation, surveillance cameras, self-driving applications, and enhanced safety by improving the object detection accuracy and estimation of its distance from the camera.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a video depth estimation system and method of using the same for video depth estimation based on temporal attention utilizing temporal consistency between frames of a video sequence.

According to some embodiments of the present disclosure, there is provided a method of depth detection based on a plurality of video frames, the method including: receiving a plurality of input frames including a first input frame, a second input frame, and a third input frame respectively corresponding to different capture times; convolving the first to third input frames to generate a first feature map, a second feature map, and a third feature map corresponding to the different capture times; calculating a temporal attention map based on the first to third feature maps, the temporal attention map including a plurality of weights corresponding to different pairs of feature maps from among the first to third feature maps, each weight of the plurality of weights indicating a similarity level of a corresponding pair of feature maps; and applying the temporal attention map to the first to third feature maps to generate a feature map with temporal attention.

In some embodiments, the plurality of weights are based on a learnable value.

In some embodiments, each weight $A_{ij}$ of the plurality of weights of the temporal attention map is expressed as:

$$A_{ij} = \frac{s^{M_r^j \cdot M_r^i}}{\sum_{k=1}^{3C} s^{M_r^j \cdot M_r^i}}$$

where i and j are index values greater than zero, s is a learnable scaling factor, $M_r$ is a reshaped combined feature map based on the first to third feature map, and c represents a number of channels in each of the first to third feature maps.

In some embodiments, the applying the attention map includes calculating elements $Y^i$ of the feature map with temporal attention as:

$$Y^i = \Sigma_{j=1}^{3C}(A_{ij}M_r^j)$$

where i is an index value greater than 0.

In some embodiments, the input frames are video frames of an input video sequence.

In some embodiments, the input frames are motion-compensated warped frames based on video frames.

In some embodiments, the method further includes: receiving a plurality of warped frames including a first warped frame, a second warped frame, and a third warped frame; and spatially dividing each of the first to third warped frames into a plurality of patches, wherein the first input frame is a patch of the plurality of patches of the first warped frame, wherein the second input frame is a patch of the plurality of patches of the second warped frame, and wherein the third input frame is a patch of the plurality of patches of the third warped frame.

In some embodiments, the method further includes: receiving a first video frame, a second video frame, and a third video frame, the first to third video frames being successive frames of a video sequence; compensating for motions between the first to third video frames based on optical flow to generate the first to third input frames; and generating a depth map based on the feature map with temporal attention, the depth map including depth values of pixels of the second video frame.

In some embodiments, the compensating for motions includes: determining optical flow of pixels of the second video frame based on pixels of the first and third video frames; and image warping the first to third input frames based on the determined optical flow.

In some embodiments, the method further includes: receiving a first video frame, a second video frame, and a third video frame, the first to third video frames being successive frames of a video sequence; generating a first depth map, a second depth map, and a third depth map based on the first to third video frames; compensating for motions between the first to third depth maps based on optical flow to generate the first to third input frames; and convolving the feature map with temporal attention to generate a depth map, the depth map including depth values of pixels of the second video frame.

In some embodiments, the first to third input frames are warped depth maps corresponding to the first to third depth maps.

In some embodiments, generating the first to third depth maps includes: generating the first depth map based on the first video frame; generating the second depth map based on the second video frame; and generating the third depth map based on the third video frame.

According to some embodiments of the present disclosure, there is provided a method of depth detection based on a plurality of video frames, the method including: receiving a plurality of warped frames including a first warped frame, a second warped frame, and a third warped frame corresponding to different capture times; dividing each of the first to third warped frames into a plurality of patches including a first patch; receiving a plurality of input frames including a first input frame, a second input frame, and a third input frame; convolving the first patch of the first warped frame, the first patch of the second warped frame, and the first patch of the third warped frame to generate a first feature map, a second feature map, and a third feature map corresponding to the different capture times; calculating a temporal attention map based on the first to third feature maps, the temporal attention map including a plurality of weights corresponding to different pairs of feature maps from among the first to third feature maps, each weight of the plurality of weights indicating a similarity level of a corresponding pair of feature maps; and applying the temporal attention map to the first to third feature maps to generate a feature map with temporal attention.

In some embodiments, the plurality of warped frames are motion compensated video frames.

In some embodiments, the plurality of warped frames are motion compensated depth maps corresponding to a plurality of input video frames of a video sequence.

In some embodiments, the method further includes: receiving a first video frame, a second video frame, and a third video frame, the first to third video frames being successive frames of a video sequence; compensating for motions between the first to third video frames based on optical flow to generate the first to third warped frames; and generating a depth map based on the feature map with temporal attention, the depth map including depth values of pixels of the second video frame.

In some embodiments, the compensating for motions includes: determining optical flow of pixels of the second video frame based on pixels of the first and third input frames; and image warping the first to third video frames based on the determined optical flow.

In some embodiments, the method further includes: receiving a first video frame, a second video frame, and a third video frame, the first to third video frames being successive frames of a video sequence; generating a first depth map, a second depth map, and a third depth map based on the first to third video frames; compensating for motions between the first to third depth maps based on optical flow to generate the first to third input frames; and convolving the feature map with temporal attention to generate a depth map, the depth map including depth values of pixels of the second video frame.

In some embodiments, the first to third input frames are warped depth maps corresponding to the first to third depth maps.

According to some embodiments of the present disclosure, there is provided a system for depth detection based on a plurality of video frames, the system including: a processor; and a processor memory local to the processor, wherein the processor memory has stored thereon instructions that, when executed by the processor, cause the processor to perform: receiving a plurality of input frames including a first input frame, a second input frame, and a third input frame respectively corresponding to different capture times; convolving the first to third input frames to generate a first feature map, a second feature map, and a third feature map corresponding to the different capture times; calculating a temporal attention map based on the first to third feature maps, the temporal attention map including a plurality of weights corresponding to different pairs of feature maps from among the first to third feature maps, each weight of the plurality of weights indicating a similarity level of a corresponding pair of feature maps; and applying the temporal attention map to the first to third feature maps to generate a feature map with temporal attention.

BRIEF DESCRIPTION OF THE DRAWINGS

The patent or application file contains at least one drawing executed in color. Copies of this patent or patent application publication with color drawings will be provided by the Office upon request and payment of the necessary fee.

A more complete appreciation of the present disclosure, and many of the attendant features and aspects thereof, will become more readily apparent as the disclosure becomes better understood by reference to the following detailed description when considered in conjunction with the accompanying drawings in which like reference symbols indicate like components, wherein:

FIGS. 2A-2D provide an RGB visualization of the operation of the temporal attention subsystem in relation to a reference video frame of an input video sequence, according to some example embodiments of the present disclosure;

FIGS. 2E-2H provide an RGB visualization of the operation of the temporal attention subsystem in relation to a different reference video frame of an input video sequence, according to some example embodiments of the present disclosure;

DETAILED DESCRIPTION

The detailed description set forth below is intended as a description of example embodiments of a system and method for video depth estimation, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Some embodiments of the present disclosure are directed to a video depth estimation system and method of using the same for video depth estimation based on temporal attention utilizing temporal consistency between frames of a video sequence. Currently, depth estimation methods using input video do not consider the temporal consistency when estimating the depth. Although some methods of the related art may utilize video sequences during the training procedure, the prediction procedure is single-frame based. That is, when estimating the depth of frame t, the information of frame t−1 or frame t+1 are not used. This limits the accuracy of such methods of the related art as temporal consistency between frames is ignored.

According to some embodiments, the video depth estimation system (also referred to as a depth estimation system) is capable of estimating the real world depth of elements in a video sequence captured by single camera. In some embodiments, the depth estimation system includes three sub systems, a motion compensator, a temporal attention subsystem, and the depth estimator. By arranging these three subsystems in different orders, the depth estimation system utilizes the temporal consistency in the RGB (red, green, and blue color) domain according to some embodiments, or in the depth domain according to some other embodiments.

Figure 1:
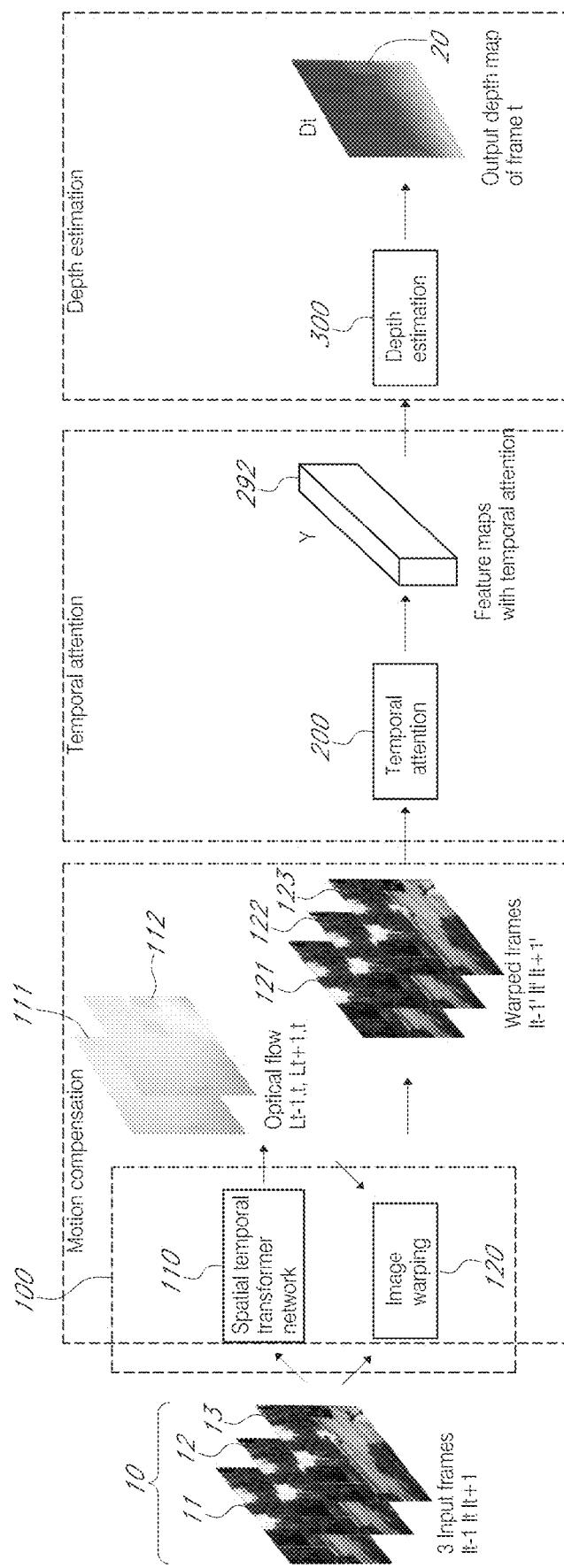
FIG. 1 illustrates subsystems of the depth estimation system, according to some embodiments of the present disclosure.

FIG. 1 illustrates subsystems of the depth estimation system 1, according to some embodiments of the present disclosure.

Referring to FIG. 1, the depth estimation system 1 according to some embodiments, includes a motion compensator 100, a temporal attention subsystem 200, and a depth estimator 300. The motion compensator 100 receives a plurality of video frames 10 including a first video frame 11, a second video frame 12 (also referred to a reference video frame), and a third video frame 13, which represent successive frames (e.g., consecutive frames) of a video sequence.

In some embodiments, the motion compensator 100 is configured to compensate for pixel motions between the first to third video frames 11-13 based on optical flow and to generate the first to third input frames 11-13 (e.g., first to third warped frames). The motion compensator 100 may align the temporal consistency between successive frames (e.g., adjacent frames). The motion compensator 100 may include a spatial temporal transformer network 110 and an image warper 120. In some examples, the spatial temporal transformer network 110 may determine the optical flow (e.g., motion vector) of the pixels of the successive frames and generate a first optical flow map 111 indicating the optical flow of pixels from the first video frame 11 to the second video frame 12, and generate a second optical flow map 112 indicating the optical flow of pixels from the third video frame 13 to the second video frame 12. The image warper 120 utilizes the first and second optical flow maps 111 and 112 to warp the input frames 11 and 13 and generate first and third warped frames 121 and 123 (e.g., first and third RGB frames) that attempt to compensate for the movement of regions (i.e., pixels) of the input frames 11 and 13. The warped frame 122 may be the same as the input frame 12 (e.g., the reference frame). Camera angle or perspective changes, occlusions, objects moving out of frame, etc. may result in inconsistencies in the warped frames 121-123. Such inconsistencies could confuse the depth estimation if the warped frames 121-123 were fed directly to the depth estimator 300. However, the temporal attention subsystem 200 may resolve this issue by extracting and emphasizing the consistent information among the motion-compensated warped frames 121-123.

As used herein, consistent information refers to the characteristic of the same object (e.g., appearance, structure) being the same in successive (e.g., adjacent) frames. For example, when the motion of a moving car is estimated correctly by the motion compensator 100 in consecutive frames, the shape and color of the car appearing in the successive (e.g., adjacent) warped frames may be similar. Consistency may be measured by a difference between the input feature maps to the temporal attention subsystem 200 and the output feature map 292 of the temporal attention subsystem 200.

In some embodiments, the temporal attention subsystem 200 identifies which regions of a reference frame (e.g., the second/center video frame 12) are more important and should be given greater attention. In some examples, the temporal attention subsystem 200 identifies differences between its input frames (e.g., the warped frames 121-123) and assigns weights/confidence values to each pixel of the frames based on temporal consistency. For example, when a region changes from one frame to the next, the confidence level for the pixels in that region may be lower. The weights/confidence values of the pixels together make up a temporal attention map, which the temporal attention subsystem 200 utilizes to reweigh the frames it receives (e.g., the warped frames 121-123).

According to some embodiments, the depth estimator extracts the depth of the reference frame (e.g., the second/center video frame 12) based on the output feature map 292 of temporal attention subsystem 200.

FIGS. 2A-2D provide an RGB visualization of the operation of the temporal attention subsystem 200 in relation to a reference video frame of an input video sequence, according to some example embodiments of the present disclosure. FIGS. 2E-2H provide an RGB visualization of the operation of the temporal attention subsystem 200 in relation to a different reference video frame of an input video sequence, according to some example embodiments of the present disclosure.

FIGS. 2A and 2E illustrates reference frames of an input video sequence to the temporal attention subsystem 200, and FIGS. 2B-2D and 2E-2H illustrate the respective attention maps, visualized in the B-channel, the G-channel, and the R-channel. The temporal attention weight map is displayed as the difference between the input and output of the temporal attention subsystem 200. In FIGS. 2B-2D, brighter colors indicate a larger difference, corresponding to motion inconsistency. For example, if a pixel in the output of the temporal attention subsystem 200 is the same as the input, the difference map will be 0 (shown as black) for that pixel. As shown in FIGS. 2B-2D, the attention focuses on the car, as the car is the most important moving object. There is also some weak attention to the tree leaves due to the difficulty in leaves' motion estimation. In FIGS. 2E-2H, the attention is focused on all major regions with motion. Compared to FIG. 2A, the illumination of the reference frame in FIG. 2E is more complicated (see, e.g., the shadows), and the objects are closer to the camera. Therefore, the temporal consistency displayed in FIGS. 2F-2H is more complicated. Further, the attention map of B-channel in FIG. 2F has higher value in the sky compared to G-channel and R-channel in FIGS. 2G and 2H. A reason is that the B-channel prefers looking at the moving objects with blue color, and the sky is the largest moving 'object' in the reference frame of FIG. 2E.

Figure 3:
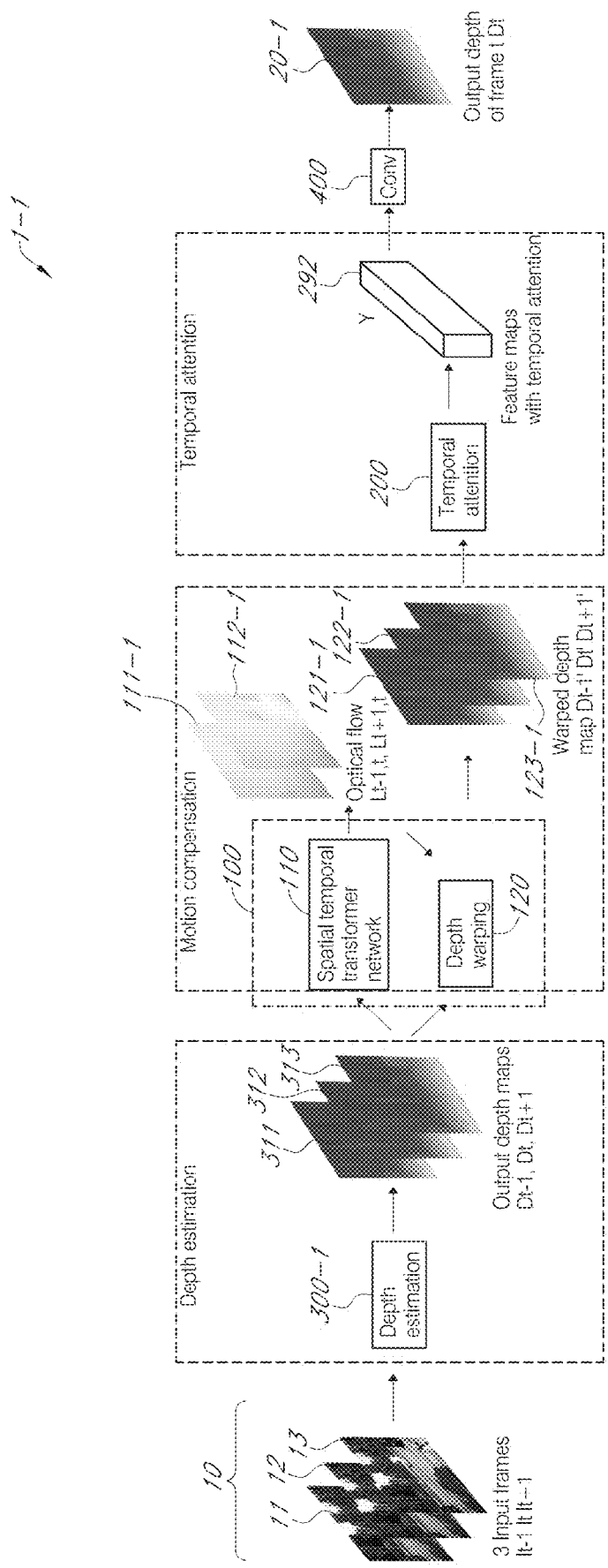
FIG. 3 illustrates subsystems of the depth estimation system, according to some other embodiments of the present disclosure.

FIG. 3 illustrates subsystems of the depth estimation system 1-1, according to some other embodiments of the present disclosure. The depth estimation system 1-1 of FIG. 3 is substantially the same as the depth estimation system of FIG. 1, except for the arrangement order of the motion compensator 100-1, the temporal attention subsystem 200-1, and the depth estimator 300-1.

Referring to FIG. 3, according to some embodiments, the depth estimator 300-1 receives a plurality of video frames including the successive video frames 11-13 from a video sequence, and uses a frame-by-frame depth estimation method (such as single image depth estimation, SIDE) and generates first to third depth maps 311, 312, and 313 respectively corresponding to the first to third video frames 11-13.

In some embodiments, the motion compensator 100-1 receives the depth maps 311-313 from the depth estimator 300-1. Thus, the motion compensator 100-1 is applied in the depth domain, rather than in the time domain as is the case with the motion compensator 100 of FIG. 1. Otherwise, the motion compensator 100-1 may be identical to, or substantially similar to, the motion compensator 100 of FIG. 1. In some embodiments, the spatial temporal transformer network 110 generates optical flow maps 111-1 and 112-1 based on the depth maps 311-313, which the image warper 120 utilizes to generate the warped estimated depth maps 121-1, 122-1, and 123-1. According to some embodiments, then the temporal attention subsystem 200 is applied to extract the consistent information from the warped estimated depth maps 121-1, 122-1, and 123-1, followed by a convolutional layer 400 to obtain the final output, which is the depth map 20-1 corresponding to the reference frame (e.g., the second video frame 12). The convolutional layer 400 may be used to convert the output feature map 292 from the temporal attention subsystem to the depth map 20-1.

The depth estimation system 1 of FIG. 1 or the depth estimation system 1-1 of FIG. 3 may be used based on the trade-off between the motion compensator 100 and the depth estimator 300/300-1. The processing bottleneck of the depth estimation system 1 may be the motion compensator 100 in the RGB domain, which may be relatively difficult to perform since the appearance of objects vary with the change of illumination and color distortion among different video frames. On the other hand, the processing bottleneck of the depth estimation system 1-1 may be the depth estimator 300-1. Motion compensation in the depth domain may be easier than in the RGB domain as the illumination and color distortion may be ignored. Thus, when the motion compensator 100 is very accurate (e.g., when the accuracy of the optical flow estimation is above a set threshold), then depth estimation system 1 may be utilized. When the depth estimator 300/300-1 is very accurate (e.g., when it has accuracy greater than a set threshold), then the depth estimation system 1-1 may be utilized. According to some examples, devices (such as driver assist or autonomous vehicles) relying on depth estimation may include both of the depth estimation system 1 of FIG. 1 and the depth estimation system 1-1 of FIG. 3, and switch between the two systems as appropriate based on accuracy of optical flow estimation and depth estimation.

Figure 4A:
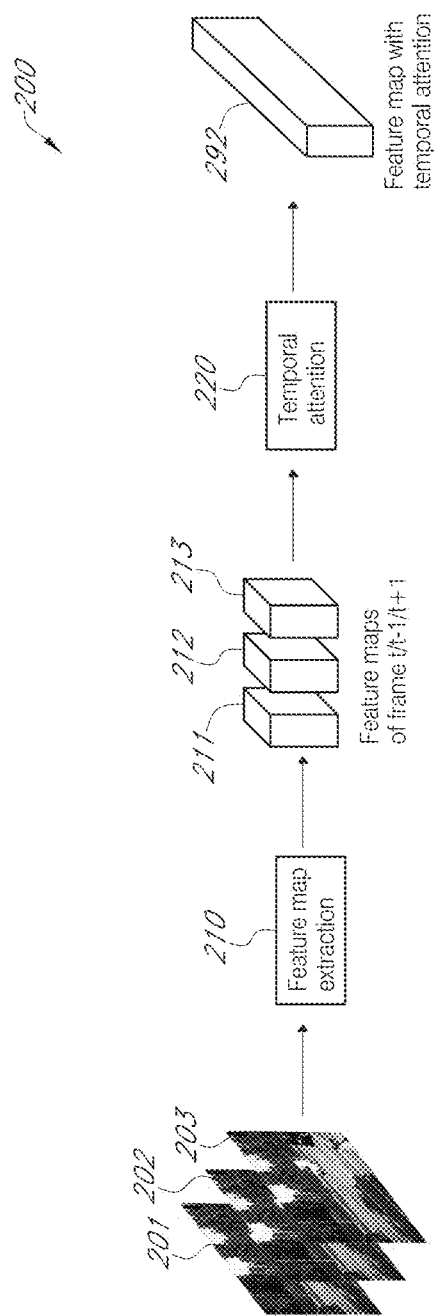
FIG. 4A-4B illustrate two different approaches for implementing the temporal attention subsystem, according to some embodiments of the present disclosure.
Figure 4B:
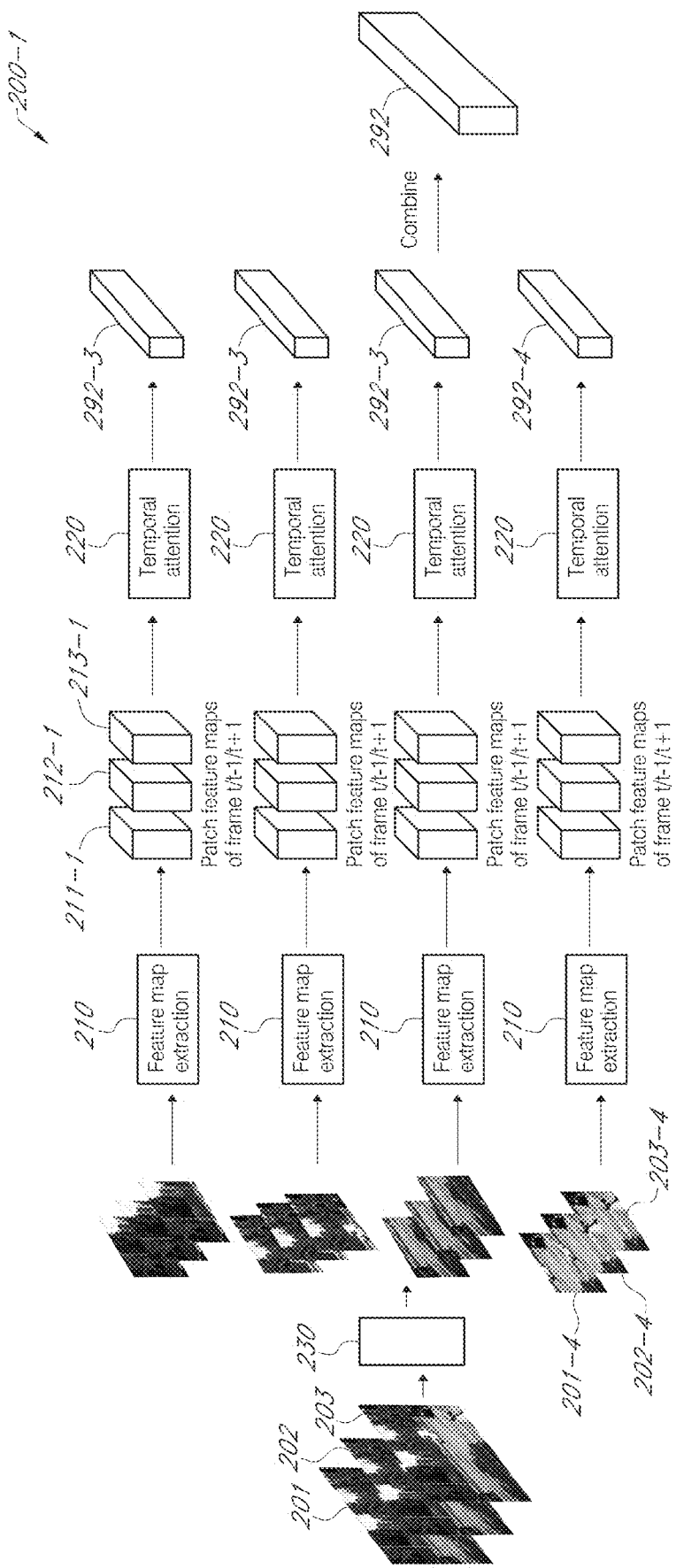

FIG. 4A-4B illustrate two different approaches for implementing the temporal attention subsystem 200/200-1, according to some embodiments of the present disclosure. In FIGS. 4A-4B, the input frames 201-203 to the temporal attention subsystem 200/200-1 are illustrated as RGB video frames for ease of illustration; however, embodiments of the present description are not limited thereto, and the input frames 201-203 may be warped frames 121-123 (as shown in FIG. 1) or the warped depth maps 121-1 to 123-1 (as shown in FIG. 3).

Referring to FIG. 4A, according to some embodiments, the temporal attention subsystem 200 includes a feature map extractor 210 configured to convert the input frames 201-203 into feature maps 211-213, which are processed by the temporal attention scaler 220 for reweighting based on temporal attention consistency. The feature map extractor 230 may be a convolutional layer applying a convolutional filter with learnable weights to the elements of the input frames 201-203. Here, the temporal attention subsystem 200 receives and processes the whole of the input frames 201-203. Adding the feature map extractor 210 before the temporal attention scaler 220 allows the temporal attention scaler 220 to more readily cooperate with deep learning frameworks of the related art. However, embodiments of the present disclosure are not limited to utilizing a feature map extractor 210 before the temporal attention scaler 220, and in some embodiments, the input frames 201-203 may be fed directly to the temporal attention scaler 220.

Referring to FIG. 4B, in some embodiments, the temporal attention subsystem 200-1 further includes a patch extractor 230 that divides each one of the input frames 201-203 into a plurality of patches or subdivisions. Each patch of an input frame is processed separately from the other patches of the input frame. For example, the patch extractor 230 may divide the input frames 201-203 into four patches, thus generating four sets of patches/sub-divisions. The first set of patches (i.e., 201-1, 202-1, and 203-1) may include the first patch of each of the input frames 201-203, and the fourth set of patches (i.e., 201-4, 202-4, and 203-4) may include the fourth patch of each of the input frames 201-203. Each patch set is processes separately by a feature map extractor 210 and temporal attention scaler 220. The different patch sets may be processed in parallel, as shown in FIG. 4B, or may be processed serially. The patch feature maps generated based on each patch set may be combined together to form a single feature map with temporal attention.

While FIG. 4B illustrates four sets of patches, embodiments of the present disclosure are not limited thereto. For example, the patch extractor 230 may divide each input frame into any suitable number of patches. The temporal attention subsystem 200-1 of FIG. 4B may improve depth estimation accuracy as each processed patch set contains visual information that is better spatially correlated than that of an entire frame. For example, in a frame that includes a car driving on a road with the sky in the background occupying the top portion of the frame, the sky only serves to complicate the depth estimation of the moving car, and may introduce inaccuracies. However, separating the sky and the car into different patches can allow the depth estimation system 1/1-1 to provide a more accurate estimate of the depth of the car in the reference frame.

Figure 5:
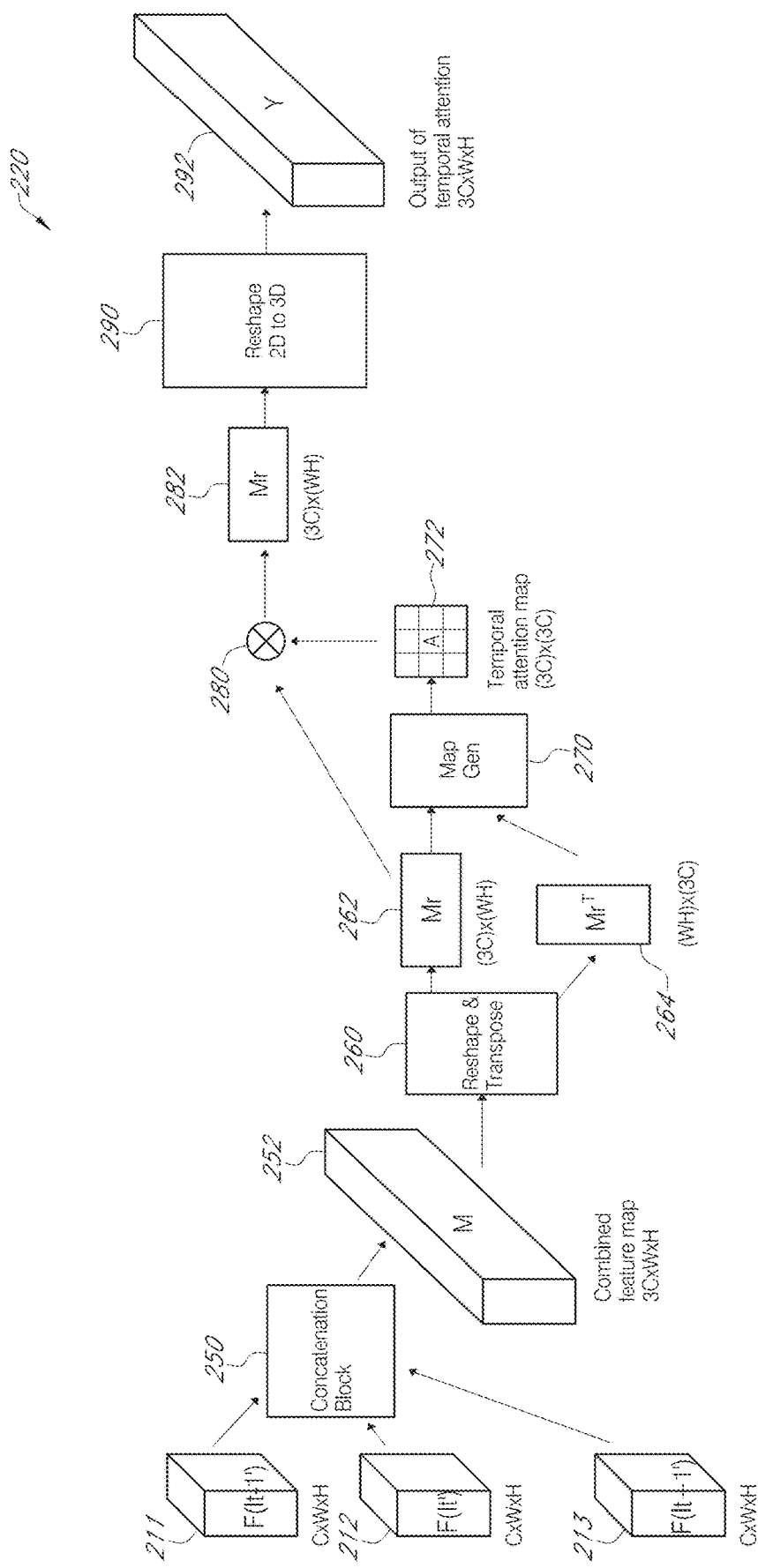
FIG. 5 is a block diagram illustration of the temporal attention scaler, according to some embodiments of the present disclosure.

FIG. 5 is a block diagram illustration of the temporal attention scaler 220, according to some embodiments of the present disclosure.

According to some embodiments, the temporal attention scaler 220 includes a concatenation block 250, a reshape and transpose block 260, a temporal attention map generator 270, a multiplier 280, and a reshape block 290.

The temporal attention scaler 220 receives the first to third feature maps 211, 212, and 213 and concatenates them into a combined feature map 252. Each of the feature maps 211-213 may have the same size C×W×H, where C indicates the number of channels (which, e.g., may correspond to color channels red, green, and blue), and W and H represent the width and height of the feature maps 211-213, which are the same as the width and height dimensions of the input video frames 201-203 (see, e.g., FIGS. 1 and 3). The combined feature map 252 may have a size of 3C×W×H. As noted above, the feature maps may be generated from warped frames 121-123 or from warped depth maps 121-1 to 123-1.

The reshape and transpose block 260 may reshape the combined feature map 252 from three dimensions (3D) to two dimensions (2D) to calculate a first reshaped map 262 having a size of (3C)×(WH), and may transpose the first reshaped map 262 to calculate a second reshaped map 264 having a size of (WH)×(3C). The temporal attention map generator 270 generates a temporal attention map 272 based on the first reshaped map 262 and the second reshaped map 264. The temporal attention map 272, may be referred to as a similarity map, and includes a plurality of weights $A_{ij}$ (where i and j are indices less than or equal to C, the number of channels) corresponding to different pairs of feature maps from among the first to third feature maps 211-213, where each weight indicates a similarity level of a corresponding pair of feature maps. In other words, each weight $A_{ij}$ indicates the similarity between the frames that generate channels i and j. When i and j come from the same frame, the weight $A_{ij}$ measures a kind of self-attention. For example, if C=3, the temporal attention map has a size 9×9 (e.g., channels 1-3 belong to feature map 211, channel 4-6 belong to feature map 212, and channel 7-9 belong to feature map 213). The weight $A_{14}$ (i=1, j=4), in the temporal attention map 272 denotes the similarity level between feature map 211 and feature map 212. A higher weight value may indicate a higher similarity between corresponding feature maps. Each weight $A_{ij}$ of the plurality of weights of the temporal attention map 272 may be expressed by Equation 1:

$$A_{ij} = \frac{s^{M_r^j \cdot M_r^i}}{\sum_{k=1}^{3C} s^{M_r^j \cdot M_r^i}} \quad (\text{Eq. 1})$$

where $M_r^i$ and $M_r^j$ are one dimensional vectors of the reshaped map 262, $M_r^i \cdot M_r^j$ is the dot product between the two vectors, s is a learnable scaling factor, and i and j are index values greater than 0 and less than or equal to C.

The multiplier 280 performs a matrix multiplication between the temporal attention map 272 and the reshaped map 262 to generate a second reshaped map 282, which is reshaped by the reshape block 290 from 2D to 3D to generate the feature map with temporal attention 292 having a size of 3C×W×H. The elements $Y^i$ of the output feature map 292 with temporal attention may be expressed by Equation 2:

$$Y^i = \Sigma_{j=1}^{3C}(A_{ij} M^j) \quad (\text{Eq. 2})$$

where $Y^i$ may represent a single channel feature map having a size of W×H.

According to some examples, the plurality of components of the depth estimation system 1/1-1, such as motion compensator, the temporal attention subsystem, and depth estimator may correspond to neural networks and/or deep neural networks (a deep neural network being a neural network that has more than one hidden layer, for use with deep learning techniques), and the process of generating said components may involve training the deep neural networks using training data and an algorithm, such as a back propagation algorithm. Training may include providing a large number of input video frames and depth maps for the input video frames with measured depth values. The neural networks then train based on this data to set the learnable values discussed above.

The operations performed by the depth estimation system according to some embodiments, may be performed by a processor that executes instructions stored on a processor memory. The instructions, when executed by the processor, cause the processor to perform the operations described above with respect to the depth estimation system 1/1-1.

While embodiments of the depth estimation system 1/1-1 are disclosed as operating on a group of three input frames with the second frame acting as a reference frame, embodiments of the present disclosure are not limited thereto. For example, embodiments of the present disclosure may employ a group of an odd number of input frames (e.g., 5 or 7 input frames), where the center frame acts as the reference frame for which the depth estimation system generates a depth map. Further, such input frames may represent a sliding window of the frames of a video sequence. In some examples, increasing the number of input frames (e.g., from 3 to 5) may improve depth estimation accuracy.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The depth estimation system and/or any other relevant devices or components according to embodiments of the present disclosure described herein may be implemented by utilizing any suitable hardware, firmware (e.g., an application-specific integrated circuit), software, or any suitable combination of software, firmware, and hardware. For example, the various components of the depth estimation system may be formed on one integrated circuit (IC) chip or on separate IC chips. Further, the various components of the depth estimation system may be implemented on a flexible printed circuit film, a tape carrier package (TCP), a printed circuit board (PCB), or formed on the same substrate. Further, the various components of the depth estimation system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of depth detection of objects in a video sequence, the method comprising:
   receiving a plurality of input frames of the video sequence each corresponding to a different capture time, the input frames being motion-compensated warped frames based on the video sequence;
   generating feature maps based on the plurality of input frames;
   generating, based on the feature maps, a similarity map comprising one or more weights each indicating a similarity level of a corresponding pair of feature maps; and
   applying the similarity map to the feature maps to generate a reweighed feature map.

2. The method of claim 1, wherein the one or more weights are based on a learnable value.

3. The method of claim 1, wherein each weight $A_{ij}$ of the one or more weights of the similarity map is expressed as:

$$A_{ij} = \frac{s^{M_r^j \cdot M_r^i}}{\sum_{k=1}^{3C} s^{M_r^j \cdot M_r^i}}$$

where i and j are index values greater than zero, s is a learnable scaling factor, $M_r$ is a reshaped combined feature map based on the feature maps, and c represents a number of channels in each one of the feature maps.

4. The method of claim 3, wherein the applying the similarity map comprises calculating elements $Y^i$ of the reweighed feature map as:

$$Y^i = \sum_{j=1}^{3C} (A_{ij} M_r^j)$$

where i is an index value greater than 0.

5. The method of claim 1, wherein the plurality of input frames comprises a first input frame, a second input frame, and a third input frame,
   wherein the generating the feature maps comprises convolving the first to third input frames to generate a first feature map, a second feature map, and a third feature map corresponding to different times, and
   wherein the one or more weights comprises a plurality of weights corresponding to different pairs of feature maps from among the first to third feature maps.

6. The method of claim 1, wherein the plurality of input frames comprises a first input frame, a second input frame, and a third input frame, and
   wherein the method further comprises:
   receiving a plurality of warped frames comprising a first warped frame, a second warped frame, and a third warped frame; and
   spatially dividing each of the first to third warped frames into a plurality of patches,
   wherein the first input frame is a patch of the plurality of patches of the first warped frame,
   wherein the second input frame is a patch of the plurality of patches of the second warped frame, and
   wherein the third input frame is a patch of the plurality of patches of the third warped frame.

7. The method of claim 1, wherein the plurality of input frames comprises a first input frame, a second input frame, and a third input frame, and
   wherein the method further comprises:
   receiving a first video frame, a second video frame, and a third video frame, the first to third video frames being successive frames of the video sequence;
   compensating for motions between the first to third video frames based on optical flow to generate the first to third input frames; and
   generating a depth map based on the reweighed feature map, the depth map comprising depth values of pixels of the second video frame.

8. The method of claim 7, wherein the compensating for motions comprises:
   determining optical flow of pixels of the second video frame based on pixels of the first and third video frames; and
   image warping the first to third input frames based on the determined optical flow.

9. The method of claim 1, wherein the plurality of input frames comprises a first input frame, a second input frame, and a third input frame, and
   wherein the method further comprises:
   receiving a first video frame, a second video frame, and a third video frame, the first to third video frames being successive frames of the video sequence;
   generating a first depth map, a second depth map, and a third depth map based on the first to third video frames;
   compensating for motions between the first to third depth maps based on optical flow to generate the first to third input frames; and
   convolving the reweighed feature map to generate a depth map, the depth map comprising depth values of pixels of the second video frame.

10. The method of claim 9, wherein the first to third input frames are warped depth maps corresponding to the first to third depth maps.

11. The method of claim 9, wherein generating the first to third depth maps comprises:

generating the first depth map based on the first video frame;

generating the second depth map based on the second video frame; and generating the third depth map based on the third video frame.

12. A method of depth detection of objects in a video sequence, the method comprising:

identifying a plurality of warped frames each corresponding to a different capture time, the warped frames being motion-compensated warped frames based on the video sequence;

generating feature maps based on the warped frames;

calculating a similarity map based on the feature maps, the similarity map comprising one or more weights each indicating a similarity level of a corresponding pair of feature maps; and applying the similarity map to the feature maps to generate a reweighed feature map.

13. The method of claim 12, wherein the plurality of warped frames are motion compensated depth maps corresponding to a plurality of input video frames of the video sequence.

14. The method of claim 12, further comprising:

receiving a first video frame, a second video frame, and a third video frame, the first to third video frames being successive frames of the video sequence;

compensating for motions between the first to third video frames based on optical flow to generate the warped frames; and generating a depth map based on the reweighed feature map, the depth map comprising depth values of pixels of the second video frame.

15. The method of claim 14, wherein the compensating for motions comprises:

determining optical flow of pixels of the second video frame based on pixels of the first and third video frames; and image warping the first to third video frames based on the determined optical flow.

16. The method of claim 12, further comprising:

receiving a first video frame, a second video frame, and a third video frame, the first to third video frames being successive frames of a video sequence;

generating a first depth map, a second depth map, and a third depth map based on the first to third video frames;

compensating for motions between the first to third depth maps based on optical flow to generate the warped maps; and convolving the reweighed feature map to generate a depth map, the depth map comprising depth values of pixels of the second video frame, wherein the warped maps are warped depth maps corresponding to the first to third depth maps.

17. The method of claim 16, wherein the plurality of warped frames comprises a first warped frame, a second warped frame, and a third warped frame, wherein the method further comprises dividing each of the first to third warped frames into a plurality of patches comprising a first patch, wherein the generating the feature maps comprises convolving the first patch of the first warped frame, the first patch of the second warped frame, and the first patch of the third warped frame to generate a first feature map, a second feature map, and a third feature map corresponding to different capture times, and wherein the one or more weights comprises a plurality of weights corresponding to different pairs of feature maps from among the first to third feature maps.

18. A system for depth detection of objects in a video sequence, the system comprising:

a processor; and a processor memory local to the processor, wherein the processor memory has stored thereon instructions that, when executed by the processor, cause the processor to perform:

receive a plurality of input frames of the video sequence each corresponding to a different capture time, the input frames being motion-compensated warped frames based on the video sequence;

generate feature maps based on the plurality of input frames;

generate, based on the feature maps, a similarity map comprising one or more weights each indicating a similarity level of a corresponding pair of feature maps; and apply the similarity map to the feature maps to generate a reweighed feature map.

* * * * *